UNITED STATES PATENT OFFICE.

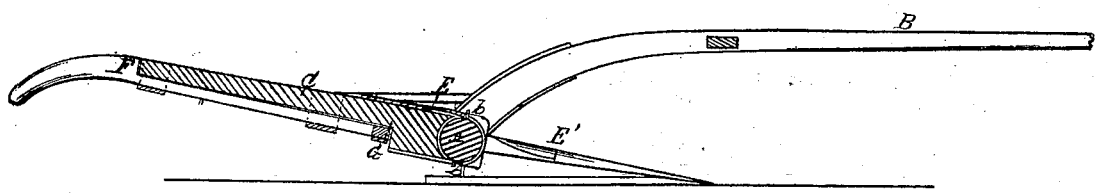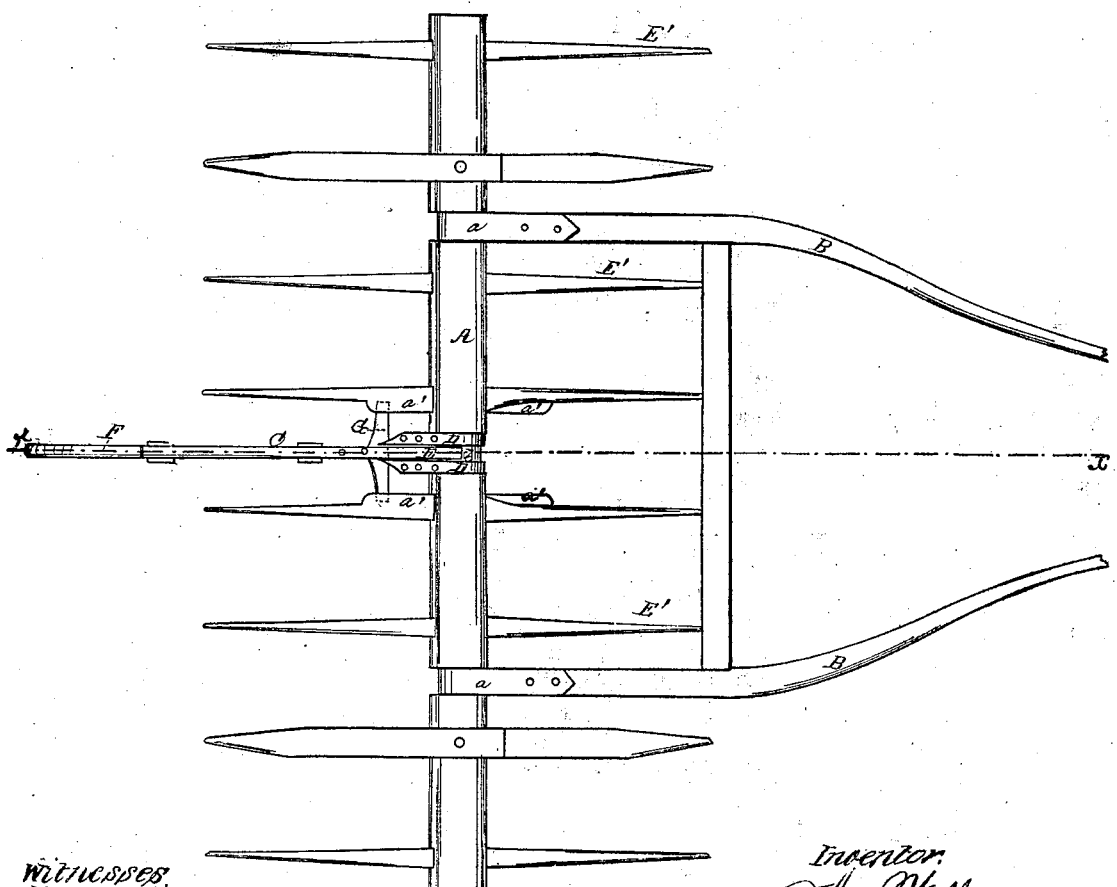

A. WELLS, OF MORGANTOWN, WEST VIRGINIA.

IMPROVEMENT IN HORSE-RAKES.

Specification forming part of Letters Patent No. 52,098, dated January 16, 1866.

*To all whom it may concern:*

Be it known that I, A. WELLS, of Morgantown, in the county of Monongalia and State of West Virginia, have invented a new and Improved Horse-Rake; and I do hereby declare that the following is a full, clear, and exact description thereof, which will enable others skilled in the art to make and use the same, reference being had to the accompanying drawings, forming part of this specification, in which—

Figure 1 is a side sectional view of my invention, taken in the line $x\ x$, Fig. 2; Fig. 2, a plan or top view of the same.

Similar letters of reference indicate like parts.

This invention relates to a new and improved horse-rake of that class which are provided with a revolving head and wooden teeth; and it consists in a novel and improved means for holding the rake or keeping it to its work, which means also admits of the rake being liberated with facility, so that it may turn and discharge its load.

A represents the rake-head, and B B the thills, which are connected to the head by means of metal straps $a\ a$, in which the rake-head is allowed to turn freely.

C represents a lever which is fitted to the rake-head A by means of metal straps D D, which are allowed to turn freely on the rake-head, said lever having a spring pawl or catch, E, attached to it, with which the projections or lips $b\ b$ on the rake-head consecutively engage to hold the rake in position or keep it to its work.

The rake-teeth E' are rigid, made of wood, and pass through the head A at right angles, projecting an equal distance from each side of it. There is nothing peculiar in the construction of the rake.

F represents a slide, which is fitted in guides, and is at the under side of the lever C, the outer end of F being curved to form a handle. The inner end of the slide F is provided with a cross-head, G, of sufficient length to lap over projecting edges $a'\ a'$ of two adjoining teeth of the rake when the slide F is shoved to its fullest extent toward the rake-head. (See Fig. 2.) This cross-head of the slide F prevents the rake from being casually rotated by the action of the front ends of the teeth against the ground, and by raising the outer end of the lever C and slide F a more or less rocking position may be given the teeth, the lip or projection $b$, which is against the pawl or spring-catch E, preventing the front ends of the rake-teeth being thrown upward. When the rake, as it is drawn along by the horse, has gathered up a sufficient quantity of hay, the driver or operator raises the rear end of the lever C and slide F, and draws back the slide F, so that its cross-head G will pass off from the projecting edges $a'\ a'$ of the two rake-teeth E', and the rake will then, under the draft movement, make a half-revolution and discharge its load, the lip $b$, which was previously at the under side, being now brought to the upper side, and, by coming in contact with the end of the spring pawl or catch E, arresting the further revolving movement of the rake and keeping it to its work, the slide F being shoved forward, so that its cross-head G will pass over the projecting edges $a'\ a'$ of the two teeth E' as soon as the rake-head has completed its half-revolution. Thus, by this simple arrangement, a very efficient device is obtained for holding the rake-head to its work—one which may be manipulated with the greaest facility and applied at a very moderate cost.

Having thus described my invention, I claim as new and desire to secure by Letters Patent—

The lever C, applied to the rake-head A, as shown, and provided with the spring pawl or catch E for the lips $b\ b$ on the rake-head to bear against, in combination with the slide F, fitted to the lever C, and provided with the cross-head G to lap over the projecting edges $a'\ a'$ of the two teeth of the rake-head, substantially as and for the purpose herein set forth.

The above specification of my invention signed by me this 30th day of October, 1865.

A. WELLS.

Witnesses:
 D. C. PICKENPAUGH,
 J. C. CHADWICK.